(12) United States Patent
Kanie et al.

(10) Patent No.: US 10,100,860 B2
(45) Date of Patent: Oct. 16, 2018

(54) SECURING CLIP ASSEMBLY

(71) Applicant: ILLINOIS TOOL WORKS INC., Glenview, IL (US)

(72) Inventors: Hideki Kanie, Aichi (JP); Jason M. Zander, Hudson, WI (US)

(73) Assignee: Illinois Tool Works Inc., Glenview, IL (US)

( * ) Notice: Subject to any disclaimer, the term of this patent is extended or adjusted under 35 U.S.C. 154(b) by 82 days.

(21) Appl. No.: 15/316,874

(22) PCT Filed: Jun. 7, 2015

(86) PCT No.: PCT/US2015/034603
§ 371 (c)(1),
(2) Date: Dec. 7, 2016

(87) PCT Pub. No.: WO2015/191405
PCT Pub. Date: Dec. 17, 2015

(65) Prior Publication Data
US 2017/0102018 A1    Apr. 13, 2017

Related U.S. Application Data

(60) Provisional application No. 62/011,181, filed on Jun. 12, 2014.

(51) Int. Cl.
*F16B 19/00* (2006.01)
*F16B 5/06* (2006.01)
*F16B 19/10* (2006.01)

(52) U.S. Cl.
CPC ............ *F16B 5/0657* (2013.01); *F16B 19/00* (2013.01); *F16B 19/008* (2013.01); *F16B 19/1081* (2013.01)

(58) Field of Classification Search
CPC ........ F16B 5/065; F16B 5/0657; F16B 19/00; F16B 19/008; F16B 19/1081; F16B 21/08
(Continued)

(56) References Cited

U.S. PATENT DOCUMENTS 3,234,612 A * 2/1966 Raymond ........... B60R 13/0206
411/352
4,176,428 A * 12/1979 Kimura ............... B60R 13/0206
24/297

(Continued)

FOREIGN PATENT DOCUMENTS

| CN | 201896831 | 7/2011 |
| CN | 103591092 | 2/2014 |
| WO | WO 2005/103507 | 11/2005 |

OTHER PUBLICATIONS

ISR and WO for PCT/US2015/034603 dated Sep. 1, 2015.

*Primary Examiner* — Roberta S Delisle
(74) *Attorney, Agent, or Firm* — Joseph M. Butscher; The Small Patent Law Group, LLC

(57) ABSTRACT

A fluid control system may include a fluid conduit defining a fluid passage, and a fluid metering assembly in fluid communication with the fluid passage. The fluid metering assembly may include a metering valve rotatably secured within an internal chamber. An actuator may be coupled to the metering valve. A control unit may be coupled to the actuator. The control unit is configured to operate the actuator to rotate the metering valve between an open position in which fluid flows through the fluid passage and a closed position in which the fluid is prevented from flowing through the fluid passage. The control unit is configured to operate the actuator to rotate the metering valve into a pressure relief position beyond the closed position that is configured to allow a reduced portion of the fluid to flow through the fluid passage.

23 Claims, 8 Drawing Sheets

(58) Field of Classification Search
USPC .......................................... 411/508, 509, 510
See application file for complete search history.

(56) References Cited

U.S. PATENT DOCUMENTS

| | | | | |
|---|---|---|---|---|
| 4,861,208 | A * | 8/1989 | Boundy | B60R 13/0206 24/297 |
| 4,927,287 | A * | 5/1990 | Ohkawa | F16B 21/086 24/297 |
| 5,339,491 | A * | 8/1994 | Sims | B60R 16/0215 16/2.2 |
| 5,704,753 | A * | 1/1998 | Ueno | F16B 21/086 24/297 |
| 5,775,860 | A * | 7/1998 | Meyer | F16B 19/1081 411/41 |
| 5,934,729 | A * | 8/1999 | Baack | B60R 13/0206 296/146.7 |
| 6,119,316 | A * | 9/2000 | Ishihara | F16B 5/0614 24/289 |
| 6,443,344 | B1 | 9/2002 | Nicosia | |
| 7,351,023 | B2 * | 4/2008 | Scroggie | F16B 5/123 24/297 |
| 7,405,939 | B2 * | 7/2008 | Yang | H01L 23/4093 257/719 |
| 7,698,787 | B2 * | 4/2010 | Scroggie | F16B 21/082 24/297 |
| 2005/0079033 | A1 * | 4/2005 | Benedetti | F16B 21/086 411/508 |
| 2014/0050548 | A1 | 2/2014 | Loewe et al. | |

* cited by examiner

SECURING CLIP ASSEMBLY

RELATED APPLICATIONS

This application is a National Phase of international Application No. PCT/US2015/034603, filed Jun. 7, 2015, and relates to and claims priority benefits from U.S. Provisional Patent Application No. 62/011,181, filed Jun. 12, 2014, which is hereby incorporated by reference in its entirety.

FIELD OF EMBODIMENTS OF THE DISCLOSURE

Embodiments of the present disclosure generally relate to securing clip assemblies that are configured to secure to one or more components, such as one or more panels.

BACKGROUND

Various clip assemblies are used to secure one component, such as a first panel, to another component, such as a second panel or another structure or device that is configured to secure to the first panel. In order to secure the components together, a clip assembly that includes a pin and grommet fastener may be used. The fastener may include a pin secured within a grommet. A top, planar portion of the pin may be adhesively secured to the first panel, while the grommet is snapably secured within a hole formed in the second panel. Typically, the grommet includes a hole that allows the pin to pass through during a mating process. The hole typically conforms to the shape of the pin shaft when the pin is secured with respect to the grommet.

Another type of clip assembly includes a pin that may be used without a separate and distinct grommet. The pin is configured to be securely mated into a hole of a panel, for example.

A cap may be positioned over a distal end of a pin. The cap may be configured to cover the distal end of the pin, so as to protect against undesired engagement. If, however, a nose of the cap is inadvertently pressed when the pin is not installed in a panel (due to misalignment, hitting the top of the panel, or the like), the cap may compress a base of the pin and stay in an unlocked condition. As such, the clip may not fully engage the hole of the panel.

Accordingly, a need exists for a clip assembly that may be securely mated to a component and remain securely mated thereto.

SUMMARY OF EMBODIMENTS OF THE DISCLOSURE

Certain embodiments of the present disclosure provide a clip assembly that is configured to secure to at least one component. The clip assembly may include a pin that may include a central beam having a distal end. First and second cap retainers may extend from the central beam. The clip assembly may also include a cap secured to the distal end of the pin. The first cap retainer is configured to securely retain the cap at a first position on the pin, and the second cap retainer is configured to securely retain the cap at a second position on the pin.

The first position may provide a removal prevention position that is configured to prevent the cap from being inadvertently removed from the pin, and/or prevent flexible arms of the pin from being squeezed together. The second position may provide an unlocked position in which the second cap retainer maintains the flexible arms in a compressed state to facilitate removal of the clip assembly from the at least one component.

In at least one embodiment, the first cap retainer may include a first ramp. Similarly, the second cap retainer may include a second ramp spaced apart from the first ramp.

The cap may include a covering nose, and lateral beams extending from the covering nose. At least one of the lateral beams may include a ramp-engaging protuberance that is configured to be secured between the first and second cap retainers in the first position, and supported by (such as over or above) the second cap retainer in the second position.

One of the pin or the cap may include at least one detent. The other of the pin or the cap may include at least one reciprocal recess configured to retain the detent(s). The detent(s) may be securely retained within the reciprocal recess(es) in the first position.

In at least one embodiment, the pin may include opposed prongs at the distal end, and opposed flexible arms outwardly extending from the central beam. The cap may be configured to be pushed toward a head of the pin to move the cap into the second position. The cap may be configured to compress the flexible arms towards one another as the cap is pushed toward the head of the pin. Each of the opposed flexible arms may include an internal protuberance that is configured to abut into a portion of the cap in the first position and be separated from the portion of the cap in the second position. The internal protuberance may be separated from the portion of the cap in a third position in which the clip assembly is securely installed to the component.

The clip assembly may also include an annular seal secured to the pin. For example, the annular seal may secure to a base of the pin. The central beam may extend from the base.

Certain embodiments of the present disclosure provide a securing system that may include a panel including a hole, and a clip assembly configured to secure to at least one component. The clip assembly may include a pin including a central beam having a distal end. First and second cap retainers extend from the central beam. The central beam is positioned through the hole of the panel. The system may also include a cap secured to the distal end of the pin. The first cap retainer is configured to securely retain the cap at a first position on the pin, and the second cap retainer is configured to securely retain the cap at a second position on the pin.

Figure 1:
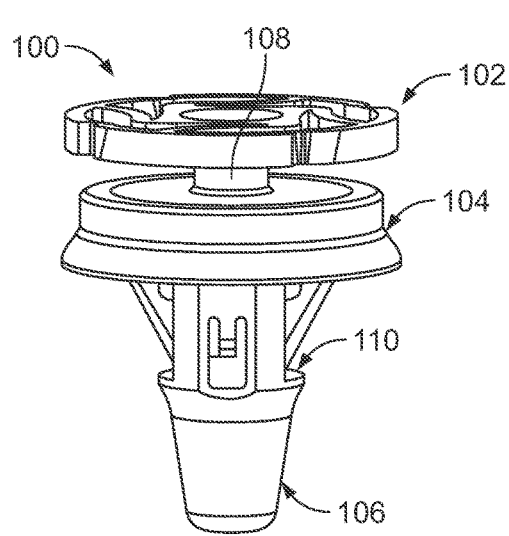
FIG. 1 illustrates a perspective top lateral view of a clip assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a clip assembly that may be configured to secure to at least one component. The clip assembly may include a pin and a cap that may be secured to an end of the pin. The pin may include a first cap retainer spaced apart from a second cap retainer. The first cap retainer is configured to securely retain the cap at a first position with respect to the pin. The second cap retainer is configured to securely retain the cap at a second position with respect to the pin. The second position differs from the first position. The first position may provide a removal prevention position that is configured to prevent the cap from being inadvertently removed from the pin, and/or prevents portions of the pin (such as flexible arms) from being squeezed or compressed together. The second position may provide an unlocked position in which the second cap retainer ensures that the flexible arms are compressed together to facilitate removal of the clip assembly from the component.

Figure 2:
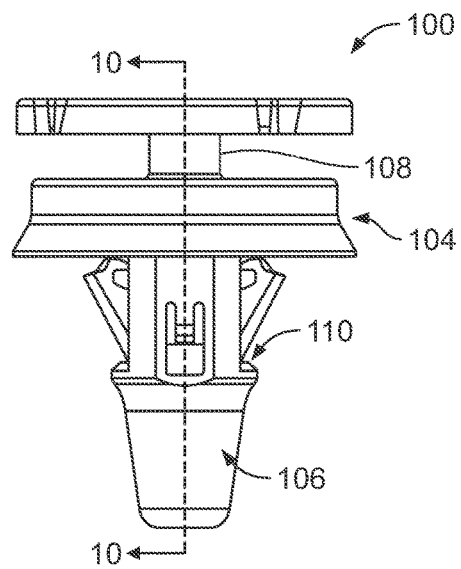
FIG. 2 illustrates a lateral view of a clip assembly, according to an embodiment of the present disclosure.

FIG. 1 illustrates a perspective top lateral view of a clip assembly 100, according to an embodiment of the present disclosure. FIG. 2 illustrates a lateral view of the clip assembly 100. Referring to FIGS. 1 and 2, the clip assembly 100 may include a pin 102, an annular seal 104, and a cap 106. The annular seal 104 may secure to the pin 102 proximate to a neck 108 of the pin 102. The cap 106 may secure to a distal end 110 of the pin 102. The pin 102, the annular seal 104, and the cap 106 may be formed of various materials, such as plastic. In at least one embodiment, the annular seal 104 may be formed of rubber or other elastomeric materials. Alternatively, the clip assembly 100 may not include the annular seal 104.

Figure 3:
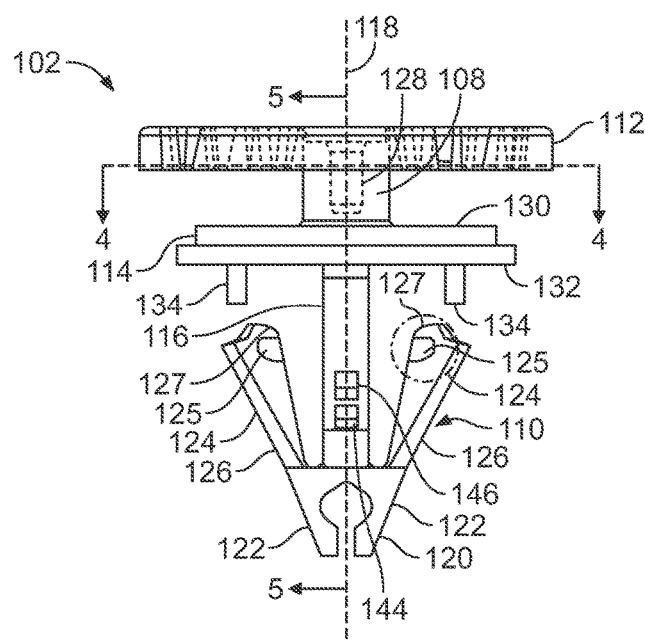
FIG. 3 illustrates a lateral view of a pin, according to an embodiment of the present disclosure.

FIG. 3 illustrates a lateral view of the pin 102, according to an embodiment of the present disclosure. The pin 102 may include a head 112 that connects to a base 114 through the neck 108. The distal end 110 may be opposite from the head 112. A central beam 116 extends downwardly from the base 114. The neck 108 and the beam 116 may be axially aligned about a central longitudinal axis 118 of the pin 102.

The beam 116 may include a distal tip 120 that is distally located from the base 114. The distal tip 120 may include opposed prongs 122 that may be configured to flex toward and away from one another. Opposed flexible retention members, such as arms, wings, or the like, extend upwardly from the distal tip 120. Each flexible retention arm 124 may include an angled outer surface 126 that angles downwardly toward the distal tip 120. As shown, the flexible arms 124 and the prongs 122 may form a W-shaped base at, near, or otherwise extending from the distal end 110 of the pin 102.

Each flexible arm 124 may include an internal protuberance 125, such as a block, proximate to an end 127 closest to the base 114. The protuberance 125 is configured to cooperate with the cap 106 (shown in FIGS. 1 and 2) to maintain the cap 106 in a removal prevention position.

A central cavity 128 may be formed through the neck 108 about the central longitudinal axis 118. The central cavity 128 may be engaged by a tool when the annular seal 104 (shown in FIGS. 1 and 2) is overmolded to the pin 102. For example, a tool may be used to secure the pin 102 in position as the annular seal 104 is overmolded to the pin 102. Alternatively, a central cavity may not be formed through the neck 108.

The base 114 may include a seal-retaining disk 130 positioned above a support plate 132. The seal-retaining disk 130 and the support plate 132 may be integrally molded and formed as a single, contiguous unitary piece. Alternatively, the seal-retaining disk 130 may be a separate piece that is secured to the support plate 132, such as through adhesives, fasteners, and/or the like. The seal-retaining disk 130 is configured to engage a portion of the annular seal 104 so that the annular seal 104 secures to the base 114.

One or more offsets 134 (such as beams, tabs, walls, studs, ring(s), and/or the like) may extend downwardly from the support plate 132 opposite from the seal-retaining disk 130. The offsets 134 are configured to set the clip assembly 100 at a desired height with respect to a component, such as a panel. For example, the offsets 134 may abut into a top surface of a panel. Alternatively, the pin 102 may not include the offsets 134.

Figure 4:
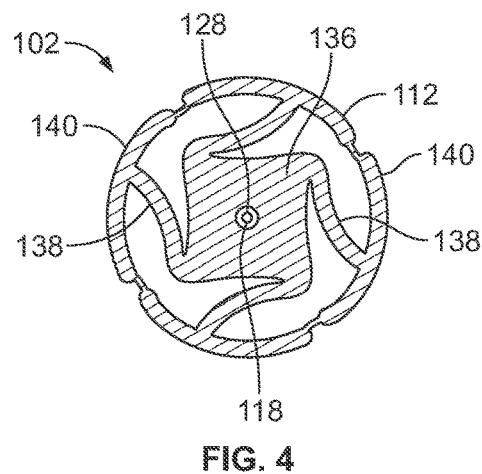
FIG. 4 illustrates a cross-sectional view of a head of a pin through line 4-4 of FIG. 3, according to an embodiment of the present disclosure.

FIG. 4 illustrates a cross-sectional view of the head 112 of the pin 102 through line 4-4 of FIG. 3, according to an embodiment of the present disclosure. The head 112 may include a central hub 136 that connects to the neck 108 (shown in FIGS. 1-3). The central hub 136 may be formed in various shapes and sizes other than shown. Arcuate extension beams 138 extend outwardly from the central hub 136 and connect to engagement beams 140, which may be semi-circular and centered about the central longitudinal axis 118. The extension beams 138 provide flexibility to the engagement beams 140. The arcuate beams 138 and the engagement beams 140 cooperate to allow the head 112 and therefore the pin to self-center with respect to a hole within a panel. Alternatively, the head 112 may be formed of various other shapes and sizes. For example, the head 112 may be a circular disk.

In at least one embodiment, a component may be configured to secure around the neck 108 between an lower surface of the head 112 and an upper surface of base 114 and/or the seal 104. For example, a component may include a hook or loop that secures around or otherwise to the neck 108.

Figure 5:
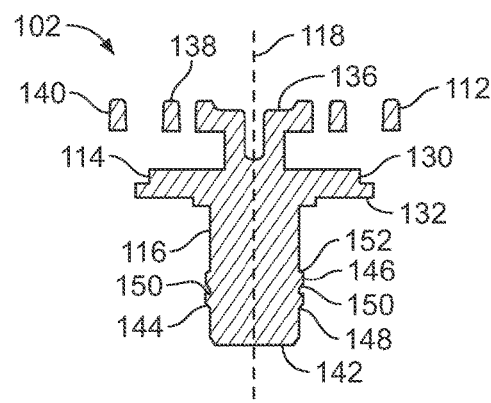
FIG. 5 illustrates a cross-sectional view of a pin through line 5-5 of FIG. 3, according to an embodiment of the present disclosure.

FIG. 5 illustrates a cross-sectional view of the pin 102 through line 5-5 of FIG. 3, according to an embodiment of the present disclosure. The beam 116 may include an end 142 that is distally located from the base 114. Referring to FIGS. 3 and 5, a first or lower cap retainer, such as a ramp 144, may outwardly extend from an outer surface of the beam 116. The lower ramp 144 may be spaced a particular distance from a second or upper cap retainer, such as a ramp 146, that may outwardly extend from an outer surface of the beam 116. As shown, the lower ramp 144 is closer to the end 142 than the upper ramp 146, while the upper ramp 146 is closer to the base 114 than the lower ramp 144. Instead of ramps, the cap retainers may be formed as various other features that are configured to securely retain reciprocal portions of a cap. For example, the cap retainers may be or otherwise include latches, barbs, clasps, or the like.

The lower ramp 144 may include an angled surface 148 that connects to a ledge 150. Similarly, the upper ramp 146 may include an angled surface 152 that connects to a ledge 152. Each ledge 150 and 152 may reside in a plane that is generally perpendicular to the longitudinal axis 118. Each angled surface 148 and 150 angles inwardly and downwardly from a respective ledge 150 and 152.

As described below, the lower ramp 144 is configured to hold the cap 106 (shown in FIGS. 1 and 2) to the pin 102 in a removal prevention position. As such, the lower ramp 144 may be a cap-retaining ramp. The upper ramp 146 is configured to hold the cap 106 in an unlocked position. Accordingly, the upper ramp 146 may be an unlocked cap-securing ramp.

Figure 6:
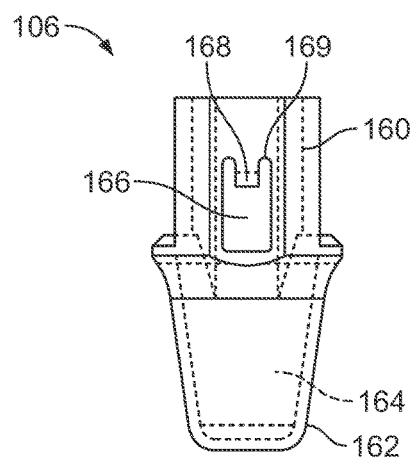
FIG. 6 illustrates a lateral view of a cap, according to an embodiment of the present disclosure.
Figure 7:
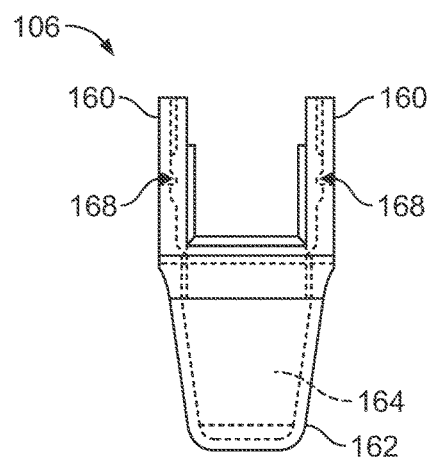
FIG. 7 illustrates a front view of a cap, according to an embodiment of the present disclosure.

FIG. 6 illustrates a lateral view of the cap 106, according to an embodiment of the present disclosure. FIG. 7 illustrates a front view of the cap 106. Referring to FIGS. 6 and 7, the cap 106 may include opposed lateral beams 160 that connect to a covering nose 162. A prong chamber 164 may be defined within the covering nose 162. The prongs 122 of the pin 102 are configured to be positioned within the prong chamber 164.

An opening 166 may be formed through each beam 160. A ramp-engaging protuberance 168 (such as a flexible arm, tab, barb, clasp, hook, or the like) may extend downwardly into the opening 166 from an internal edge 169 of the beam 160. The ramp-engaging protuberance 168 is configured to secure onto the ramps 144 and 146 of the pin 102 (shown in FIGS. 3 and 5, for example) to retain the cap 106 at defined positions with respect to the pin 102.

Figure 8:
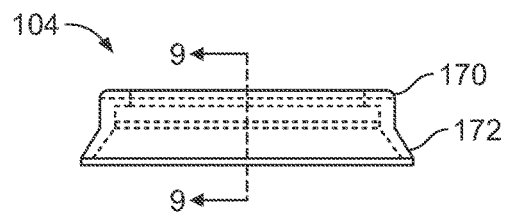
FIG. 8 illustrates a lateral view of an annular seal, according to an embodiment of the present disclosure.
Figure 9:
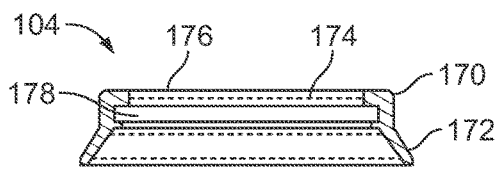
FIG. 9 illustrates a cross-sectional view of an annular seal through line 9-9 of FIG. 8, according to an embodiment of the present disclosure.

FIG. 8 illustrates a lateral view of the annular seal 104, according to an embodiment of the present disclosure. FIG. 9 illustrates a cross-sectional view of the annular seal 104 through line 9-9 of FIG. 8. Referring to FIGS. 8 and 9, the annular seal 104 may include an annular collar 170 having a flared flange 172 downwardly and radially extending therefrom. As shown in FIG. 9, in particular, an internal channel 174 is defined through the collar 170. The channel 174 is sized and shaped to securely engage the base 114 of the pin 102 (shown in FIG. 3, for example). An upper portion 176 of the channel 174 is sized and shaped to conform to an outer surface of the seal-retaining disk 130, while a lower portion 178 is sized and shaped to conform to an outer surface of the support plate 132. As noted above, the annular seal 104 may be overmolded onto the pin 102.

Figure 10:
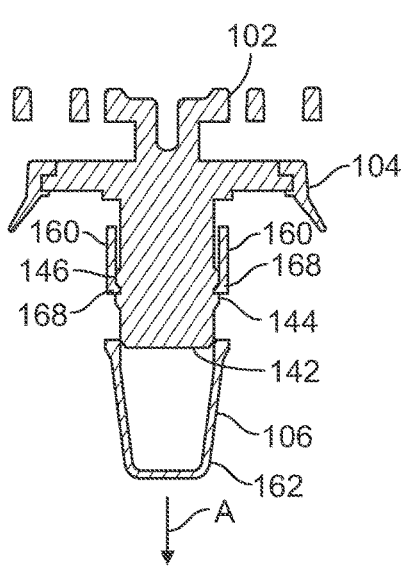
FIG. 10 illustrates a cross-sectional view of a clip assembly in a removal prevention position through line 10-10 of FIG. 2, according to an embodiment of the present disclosure.

FIG. 10 illustrates a cross-sectional view of the clip assembly 100 in a removal prevention position through line 10-10 of FIG. 2, according to an embodiment of the present disclosure. The removal prevention position may be configured to prevent the cap 106 from being inadvertently removed from the pin 102. Further, the removal prevention position may be configured to prevent the flexible arms 124 from being compressed toward one another into a disengaging or unlocked position.

As shown, in the removal prevention position, the ramp-engaging protuberances 168 may be lodged between the lower and upper ramps 144 and 146. For example, lower surfaces of the protuberances 168 may be supported on ledges 150 of the lower ramps 144. In this manner, the lower ramp 144 and the protuberances 168 may cooperate to prevent the cap from sliding off the pin 102 in the direction of arrow A.

Figure 11:
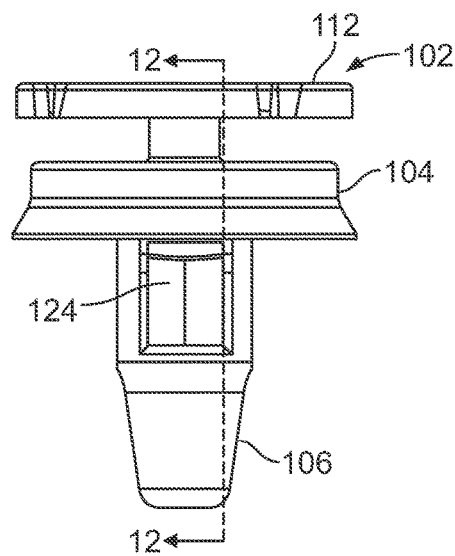
FIG. 11 illustrates a front view of a clip assembly in a removal prevention position, according to an embodiment of the present disclosure.
Figure 12:
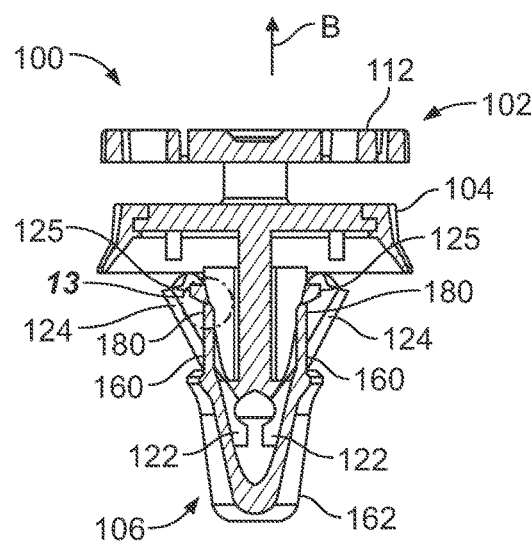
FIG. 12 illustrates a cross-sectional view of a clip assembly in a removal prevention position, according to an embodiment of the present disclosure.

FIG. 11 illustrates a front view of the clip assembly 100 in the removal prevention position, according to an embodiment of the present disclosure. FIG. 12 illustrates a cross-sectional view of the clip assembly 100 in the removal prevention position. Referring to FIGS. 11 and 12, in addition to the ramp-engaging protuberances 168 being lodged between the ramps 144 and 146 in the removal prevention position, the internal protuberances 125 of the flexible arms 124 abut into upper edges 180 of the lateral beams 160 of the cap 106.

Figure 13:
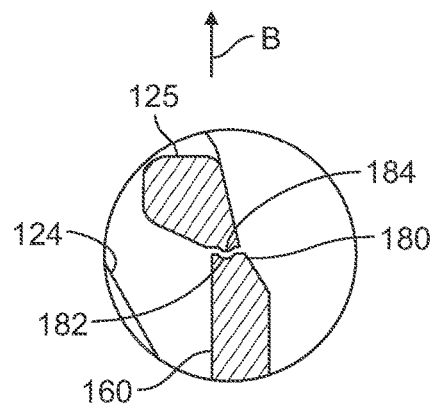
FIG. 13 illustrates a cross-sectional view of a protuberance of a flexible arm of a pin abutting into an upper edge of a lateral beam of a cap, according to an embodiment of the present disclosure.

FIG. 13 illustrates a cross-sectional view of a protuberance 125 of a flexible arm 124 of the pin 102 abutting into an upper edge 180 of a lateral beam 160 of the cap 106, according to an embodiment of the present disclosure. Referring to FIGS. 12 and 13, the upper edge 180 may include a recess, such as a divot 182 (which may be semi-spherically shaped), formed therein. The divot 182 is configured to receive a detent, such as a reciprocal bump 184, extending downwardly from the protuberance 125. As the beam 160 abuts into the protuberance 125, the bump 184 nests into the divot 182, thereby restricting axial shifting of the cap 106 with respect to the pin 102. In this manner, the protuberances 125 are braced in relation to the beams 160. In at least one embodiment, the protuberances 125 lock onto the beams 160, such as through the detent(s) mating with the recess(es), which prevents the lateral beams from compressing the flexible arms 124 towards one another. The securing interface between the protuberances 125 and the lateral beams 160 may be overcome upon exertion of a defined force (such as intentionally exerted by an individual into the cap 106) so that the lateral beams 160 may slide to outside surfaces of the protuberances 125, which then forces the flexible arms 124 inwardly (into a compressed state), as described below.

When the detent(s) is secured within the reciprocal recess(es) in the removal prevention position shown in FIGS. 12 and 13, for example, the flexible arms 124 are protected from being accidently compressed when not properly positioned within a hole of a panel, for example. Alternatively, the upper edges 180 may include the bumps, while, the protuberances 125 may include the divots. Also, alternatively, the clip assembly 100 may not include the bumps and divots shown in FIG. 13. Also, alternatively, the bumps and divots may be shaped differently than rounded, semi-spherical shapes.

Each of the flexible arms 124 of the pin 102 may include a detent, such as a semispherical bump or other such protrusion, while the upper edges 180 of the cap 106 may each include a reciprocal retaining recess, such as a divot, channel, or the like. Alternatively, the cap 106 may include the detent(s), while the pin 102 may include the retaining recess(es).

As the upper edges 180 lodge into the protuberances 125 as shown in FIGS. 12 and 13, for example, the cap 106 is blocked from sliding upwardly toward the head 112 in the direction of arrow B. As such, referring to FIGS. 10-13, in the removal prevention position, the ramp-engaging protuberances 168 of the cap 106 are supported over the lower ledge 144, thereby preventing inadvertent movement of the cap 106 relative to the pin 102 in the direction of arrow A, while the lateral beams 160 abut into the protuberances 125, thereby preventing movement of the cap 106 relative to the pin 102 in the direction of arrow B. Accordingly, the pin 102 and the cap 106 cooperate with one another in the removal prevention position to suspend the cap 106 in position with respect to the pin 102 (for example, preventing the cap 106 from axially shifting relative to the pin 102 or compressing the flexible arms 124 toward one another).

Figure 14:
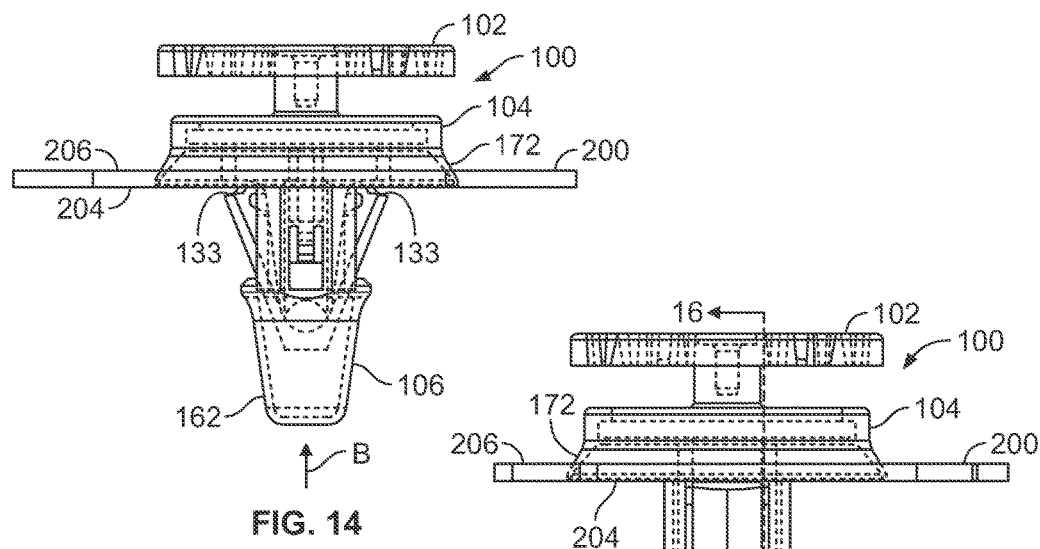
FIG. 14 illustrates a lateral view of a clip assembly in an installed position with respect to a panel, according to an embodiment of the present disclosure.
Figure 15:
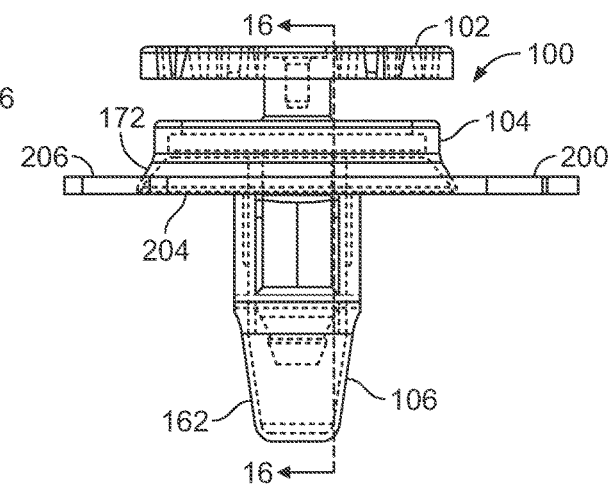
FIG. 15 illustrates a front view of a clip assembly in an installed position with respect to a panel, according to an embodiment of the present disclosure.
Figure 16:
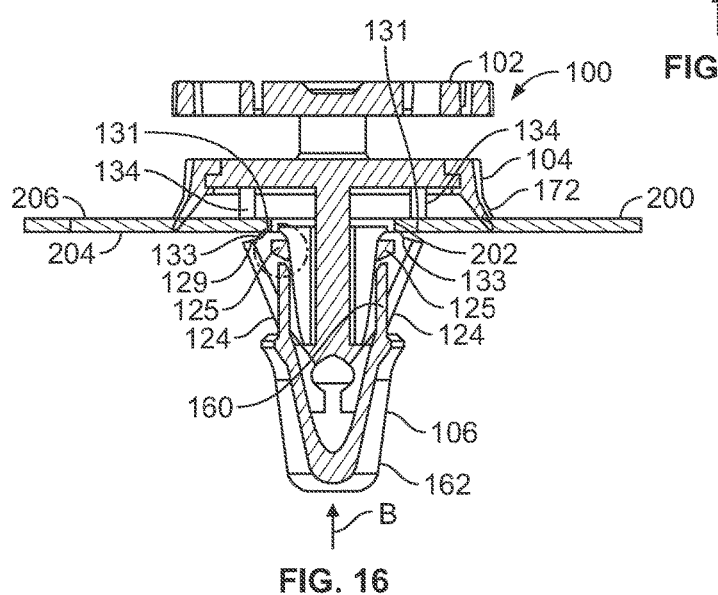
FIG. 16 illustrates a cross-sectional view of a clip assembly in an installed position with respect to a panel through line 16-16 of FIG. 15, according to an embodiment of the present disclosure.

FIG. 14 illustrates a lateral view of the clip assembly 100 in an installed position with respect to a panel 200, according to an embodiment of the present disclosure. FIG. 15 illustrates a front view of the clip assembly 100 in the installed position with respect to the panel 200. FIG. 16 illustrates a cross-sectional view of the clip assembly 100 in the installed position with respect to the panel 200 through line 16-16 of FIG. 15. The installed position refers to the position of the clip assembly 102 securely fixed to the panel 200. The clip assembly 100 and the panel 200 provide a securing system. For example, the securing system may be configured to connect another component to the panel, such as through engagement around or below the head 112.

Referring to FIGS. 14-16, in the installed position, the central beam 116 of the pin 102 is positioned through a hole 202 formed through the panel 200. Upper edges 129 of the flexible arms 124 abut into lower surfaces 204 of the panel 200, while the offsets 134 abut into upper surfaces 206 of the panel 200, thereby securely fixing the pin 102 in position with respect to the panel 200. The flange 172 of the annular seal 104 sealingly engages upper surfaces 206 of the panel. Notably, in the installed position, the protuberances 125 of the flexible arms 124 of the cap 106 may be disengaged from (that is, not directly contacting) the lateral beams 160 of the cap 106. Thus, referring to FIGS. 13 and 16, in the installed position, the protuberances 125 of the flexible arms 124 may be separated from the upper edges 180 of the cap 106 in the installed position.

In the installed position, the internal edges of the panel 200 that define the hole 202 may inwardly compress the flexible arms 124 towards one another, which may disengage the protuberances 125 from the lateral beams 160. For example, interior edges of the panel 200 that define the hole 202 may engage interior lateral edges 131 of proximal ends of the flexible arms. The flexible arms 124 may be compressively secured within the hole 202 by way of the interior edges of the panel 200. Outer upper edges 133 of the proximal ends of the flexible arms 124 may abut into a lower surface 204 of the panel 200. Notably, in the installed state, the span between the flexible arms 124 is greater than a diameter of the hole 202, thereby preventing the pin 102 from sliding out of the hole 202.

In order to remove the clip assembly 100 from the panel 200, the covering nose 162 of the cap 106 may be pressed by an individual in the direction of arrow B. As the nose 162 is pressed with sufficient force, the detent(s) and the recess(es) of the protuberances 125 and the lateral beams 160 separate, and internal surfaces of the cap 106 (such as internal surfaces of the lateral beams 160) slide up the flexible arms 124, which causes the flexible arms 124 to deflect toward one another. For example, internal surface of the lateral beams 160 may slide over outer surfaces of the protuberances 125, thereby causing the flexible arms 124 to inwardly compress. With continued urging of the cap 106 in the direction of arrow B, the cap 106 squeezes the flexible arms 124 toward one another such that the span between the flexible arms 124 is less than a diameter of the hole 202. As such, the flexible arms 124 may slide through the hole 202, the cap 106 may be removed, and the clip assembly 100 may be removed from the panel 200.

Figure 17:
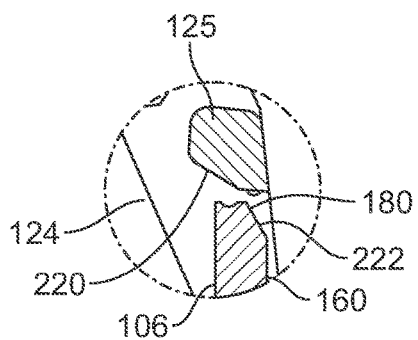
FIG. 17 illustrates a cross-sectional view of a protuberance of a flexible arm of a pin separated from an upper edge of a lateral beam of a cap in an installed position, according to an embodiment of the present disclosure.

FIG. 17 illustrates a cross-sectional view of a protuberance 125 of a flexible arm 124 of the pin separated from an upper edge 180 of a lateral beam 160 of the cap 106 in an installed position, according to an embodiment of the present disclosure. As shown, a lower outer surface of the protuberance 125 may include an angled surface 220, while an upper inner surface of the upper edge 180 may include an angled surface 222. As noted in the installed position, the protuberance 125 may be separated from the upper edge 180. As the cap 106 is pushed upwardly in the direction of arrow B (shown in FIGS. 14-16), internal surfaces of the covering nose 162 slide over outer surfaces of the flexible arms 124, thereby compressing the flexible arms 124 toward one another. During this movement, the angled surfaces 222 of the upper edges 180 slide over the angled surfaces 220 of the protuberances 125, thereby causing the flexible arms 124 to further squeeze together. As such, the flexible arms 124 may be squeezed together so that they may fit through the hole 202 of the panel 200.

Figure 18:
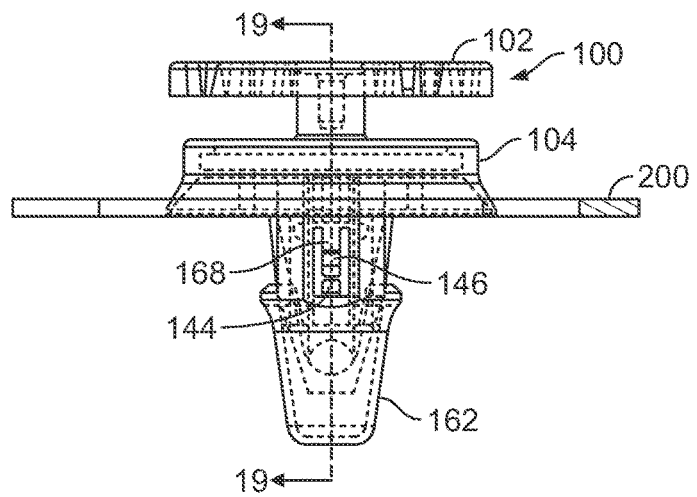
FIG. 18 illustrates a lateral view of a clip assembly in an unlocked position with respect to a panel, according to an embodiment of the present disclosure.
Figure 19:
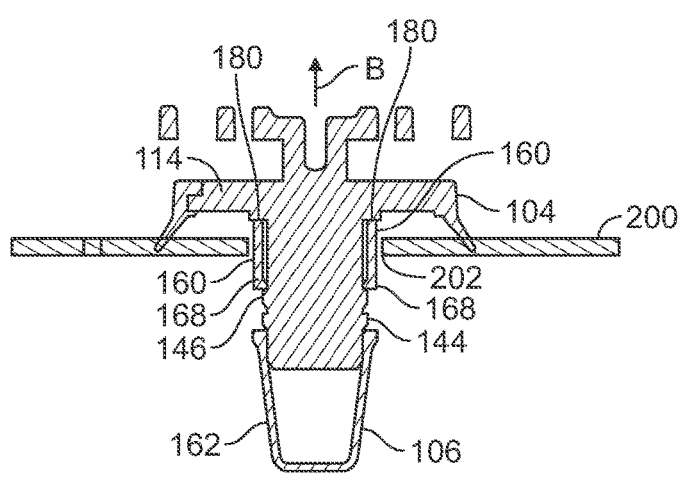
FIG. 19 illustrates a cross-sectional view of a clip assembly in an unlocked position with respect to a panel, through line 19-19 of FIG. 18, according to an embodiment of the present disclosure.

FIG. 18 illustrates a lateral view of the clip assembly 100 in an unlocked position with respect to the panel 200, according to an embodiment of the present disclosure. FIG. 19 illustrates a cross-sectional view of the clip assembly 100 in the unlocked position with respect to the panel 200, through line 19-19 of FIG. 18. Referring to FIGS. 18 and 19, in the unlocked position, the ramp-engaging protuberances 168 of the cap 106 are positioned above the upper ramps 146 of the pin 102. As such, the upper ramps 146 support the protuberances 168 in position and ensure that the cap 106 remains connected to the pin 102. In this manner, the cap 106 ensures that the flexible arms 124 remain compressed toward one another as the pin 102 is removed from the hole 202 of the panel 200. That is, the upper ramps 146 lock the cap 106 in position with respect to the pin 102 in which the flexible arms 124 are inwardly compressed (so as to be able to pass through the hole 202). In the unlocked position, the upper edges 180 of the lateral beams 160 may abut into the base 114 of the pin 102, thereby preventing the cap 106 from sliding further up the pin 102 in the direction of arrow B.

Figure 20:
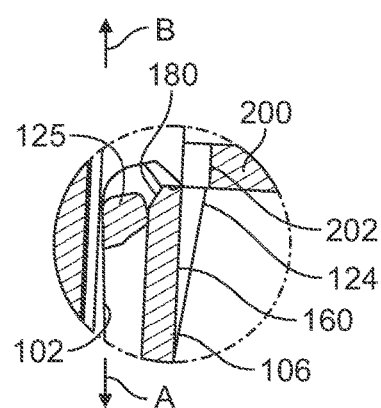
FIG. 20 illustrates a cross-sectional view of a protuberance of a flexible arm of a pin in relation to an upper edge of a lateral beam of a cap in an unlocked position, according to an embodiment of the present disclosure.

FIG. 20 illustrates a cross-sectional view of a protuberance 125 of a flexible arm 124 of the pin 102 in relation to an upper edge 180 of a lateral beam 160 of the cap 106 in an unlocked position, according to an embodiment of the present disclosure. In the unlocked position, the flexible arms 124 are inwardly squeezed towards one another, thereby minimizing or otherwise reducing the span between the flexible arms 124. As such, in the unlocked position, the span between the flexible arms 124 is less than a diameter of the hole 202 of the panel 200, thereby allowing the pin 102 to be removed from the hole 202 in the direction of arrow B. To remove the clip assembly 100 from the panel 200, the cap 106 may disconnect from the pin 102 in the direction of arrow A as the pin 102 is removed from the panel 200 in the direction of arrow A (if the diameter of the cap 106 exceeds the diameter of the hole 202). Alternatively, the cap 106 may have a diameter that is less than that of the hole (or the cap 106 may be squeezed by an individual to be able to move the cap 106 into the hole 202), thereby allowing the cap 106 to stay connected to the pin 102 and be removed through the hole 202 in the direction of arrow B.

Referring to FIGS. 1-20, embodiments of the present disclosure provide a clip assembly that may include a cap that is configured to be positioned over a distal end of a pin. The cap may include one or more flexible retention member (such as one or more ramp engaging members that may be configured to interface with a first ramp (such as a bottom or lower ramp) on the pin to hold the cap onto the pin in a removal prevention position. A second ramp (such as an upper or top ramp) of the pin is configured to hold the cap in an unlocked position. The second ramp of the pin may be configured to interact with the flexible retention member(s) of the cap to hold the cap in an unlocked position, thereby keeping the W-base wings of the pin compressed until the clip assembly is removed from the panel.

Embodiments of the present disclosure provide a clip assembly that may include a pin having a base with flat surfaces and a protuberance that interacts with a reciprocal feature, such as indentation, in the cap that are configured to lock with respect to one another when a nose of the cap is inadvertently pressed (such as an exerted force that does not meet or exceed a defined release force, such as may be exerted by an individual pushing the cap). As such, the pin is prevented from being inadvertently pushed into an unlocked position, thereby ensuring that the clip assembly securely engages into a hole of a panel when installed therein.

Figure 21:
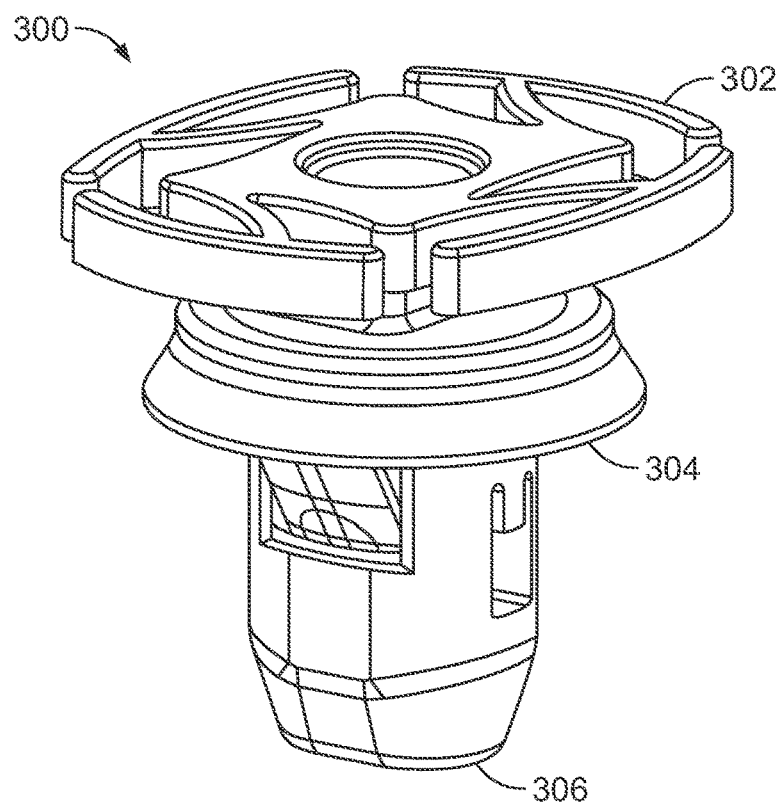
FIG. 21 illustrates a perspective top view of a clip assembly, according to an embodiment of the present disclosure.
Figure 22:
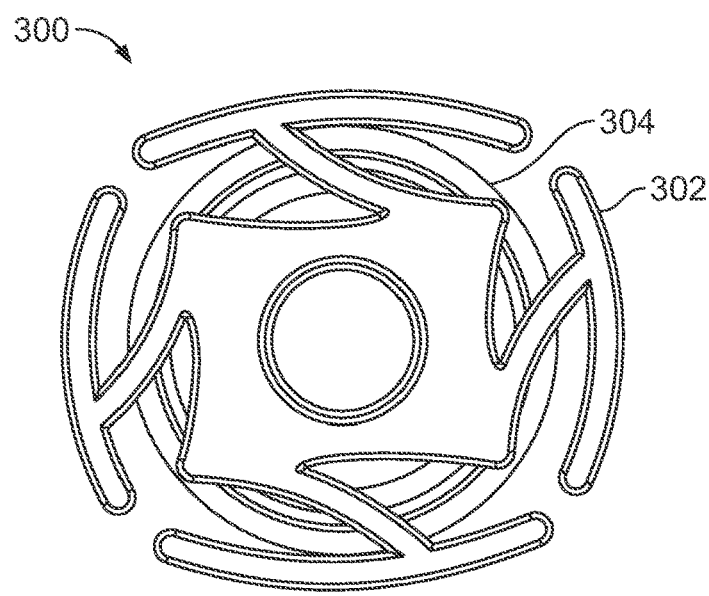
FIG. 22 illustrates a top view of a clip assembly, according to an embodiment of the present disclosure.
Figure 23:
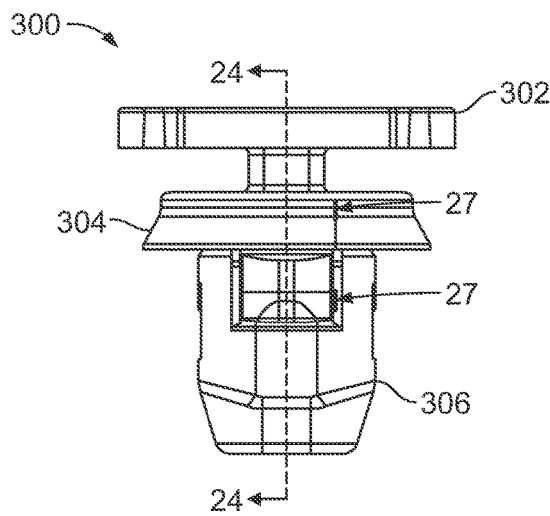
FIG. 23 illustrates a front view of a clip assembly, according to an embodiment of the present disclosure.
Figure 24:
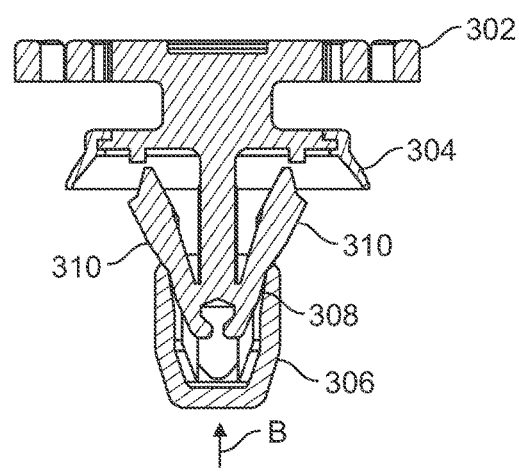
FIG. 24 illustrates a cross-sectional view of a clip assembly through line 24-24 of FIG. 23, according to an embodiment of the present disclosure.

FIG. 21 illustrates a perspective top view of a clip assembly 300, according to an embodiment of the present disclosure. FIG. 22 illustrates a top view of the clip assembly 300. FIG. 23 illustrates a front view of the clip assembly 300. Referring to FIGS. 21-23, the clip assembly 300 is similar to the clip assembly 100, except that sizes and shapes of certain components may be different. The clip assembly 300 may include a pin 302, an annular seal 304, and a cap 306, as described above FIG. 24 illustrates a cross-sectional view of the clip assembly 300 through line 24-24 of FIG. 23. As can be appreciated, as the cap 306 is pushed upward in the direction of arrow B in relation to the pin 302, internal surfaces 308 of the cap 306 squeeze the flexible arms 310 towards one another.

Figure 25:
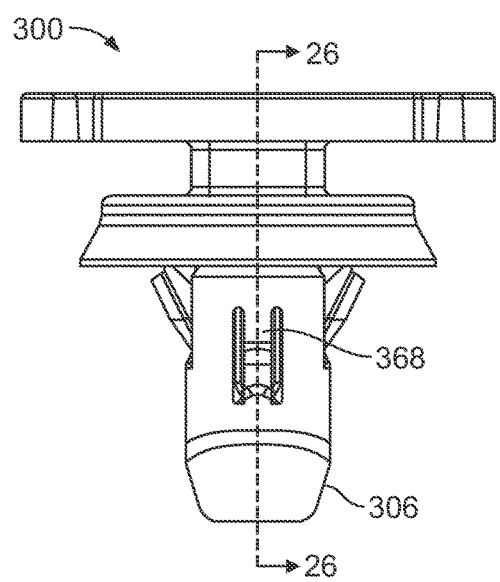
FIG. 25 illustrates a lateral view of a clip assembly, according to an embodiment of the present disclosure.
Figure 26:
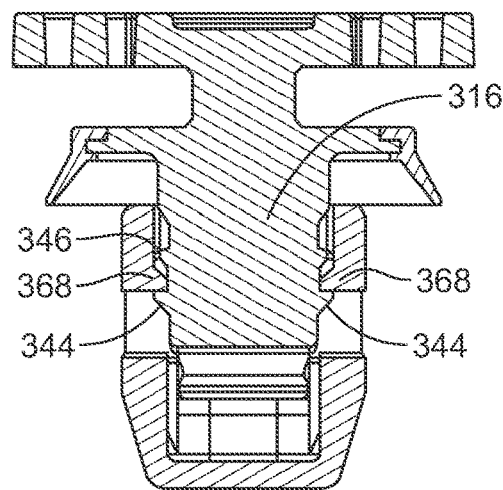
FIG. 26 illustrates a cross-sectional view of a clip assembly through line 26-26 of FIG. 25, according to an embodiment of the present disclosure.

FIG. 25 illustrates a lateral view of the clip assembly 300. FIG. 26 illustrates a cross-sectional view of the clip assembly 300 through line 26-26 of FIG. 25. FIGS. 25 and 26 illustrate the clip assembly 300 in a removal prevention position, in which ramp-engaging protuberances 368 of the cap 306 are supported over a first cap retainer, such as a lower ramp 344, of a central beam 316 of the pin 302. The ramp-engaging protuberances 368 may be lodged between the lower ramp 344 and a second cap retainer, such as an upper ramp 346, of the pin 302 in the removal prevention position.

Figure 27:
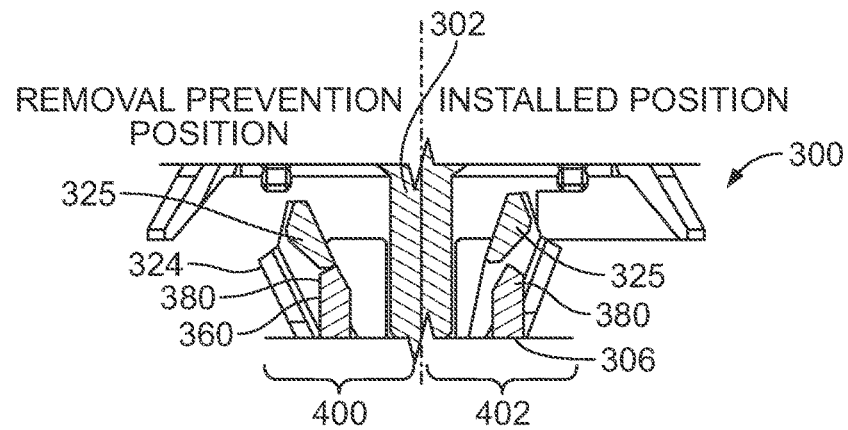
FIG. 27 illustrates a cross-sectional view of a clip assembly through line 27-27 of FIG. 23, according to an embodiment of the present disclosure.

FIG. 27 illustrates a cross-sectional view of the clip assembly 300 through line 27-27 of FIG. 23, according to an embodiment of the present disclosure. As shown in FIG. 27, one side 400 of the clip assembly 300 is shown in the removal prevention position, while an opposite side 402 of the clip assembly 300 is shown in the installed position. In the cap removal position, upper edges 380 of the lateral beams 360 of the cap 306 abut into protuberances 325 of the flexible arms 324, thereby preventing the flexible arms 324 from compressing together, as described above. In the installed position, the protuberances 325 are separated from the upper edges 380, as described above.

Figure 28:
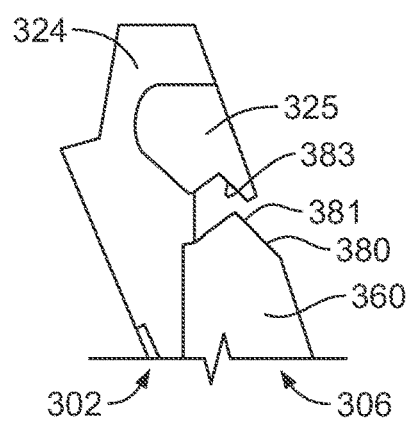
FIG. 28 illustrates a cross-sectional view of a protuberance of a flexible arm of a pin abutting into an upper edge of a lateral beam of a cap, according to an embodiment of the present disclosure.

FIG. 28 illustrates a cross-sectional view of a protuberance 325 of a flexible arm 324 of the pin 302 abutting into an upper edge 380 of a lateral beam 360 of the cap 106, according to an embodiment of the present disclosure. The upper edge 380 may include a detent, such as a straight angled ridge 381, extending upwardly therefrom. The ridge 381 is configured to be received by a recess, such as a divot 383, extending into the protuberance 325. As the beam 360 abuts into the protuberance 325, the ridge 381 nests into the divot 383, thereby restricting axial shifting of the cap 106 with respect to the pin 102, and preventing the cap 306 from compressing the flexible arms 324 together. Alternatively, the upper edges 380 may include the divots, while, the protuberances 325 may include the ridges.

The straight, flat surfaces of the divots and the ridges provide a more secure relationship between the flexible arms 324 and the lateral beams 360 in the removal prevention position. That is, the flat, angled interfaces provide a secure locking relationship therebetween, which may be less susceptible to inadvertent disengagement as compared to smooth, curved interfaces.

Referring to FIGS. 1-28, embodiments of the present disclosure provide a clip assembly that includes a pin having a first cap retainer, such as a lower ramp, and a second cap retainer, such as an upper ramp. The first and second cap retainers may be configured to hold or otherwise retain one or more portions of a cap. For example, the first cap retainer may be configured to retain the cap in a removal prevention position that is configured to prevent the cap from inadvertently squeezing flexible arms of the pin together. The second cap retainer may be configured to retain the cap in an unlocked position, in which the flexible arms of the pin are inwardly squeezed to allow the clip assembly to be removed from a component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A clip assembly configured to secure to at least one component, the clip assembly comprising:
   a pin comprising a central beam having a distal end, wherein first and second cap retainers extend from the central beam; and
   a cap secured to the distal end of the pin, wherein the first cap retainer is configured to securely retain the cap at a first position on the pin, and wherein the second cap retainer is configured to securely retain the cap at a second position on the pin,
   wherein one of the pin or the cap comprises at least one detent and the other of the pin or the cap comprises at least one reciprocal recess configured to retain the at least one detent, wherein the at least one detent is securely retained within the at least one reciprocal recess in the first position.

2. The clip assembly of claim 1, wherein the first position is a removal prevention position that is configured to one or both of prevent the cap from being inadvertently removed from the pin, or prevent flexible arms of the pin from being squeezed together.

3. The clip assembly of claim 1, wherein the second position is an unlocked position in which the second cap retainer maintains flexible arms of the pin in a compressed state to facilitate removal of the clip assembly from the at least one component.

4. The clip assembly of claim 1, wherein the first cap retainer comprises a first ramp, and wherein the second cap retainer comprises a second ramp spaced apart from the first ramp.

5. The clip assembly of claim 1, wherein the cap comprises:
   a covering nose; and
   lateral beams extending from the covering nose, wherein at least one of the lateral beams comprises a ramp-engaging protuberance, wherein the ramp-engaging protuberance is secured between the first and second cap retainers in the first position, and wherein the ramp-engaging protuberance is supported by the second cap retainer in the second position.

6. The clip assembly of claim 1, wherein the pin further comprises:
   opposed prongs at the distal end; and
   opposed flexible arms outwardly extending from the central beam.

7. The clip assembly of claim 6, wherein the cap is configured to be pushed toward a head of the pin to move the cap into the second position, and wherein the cap compresses the flexible arms towards one another as the cap is pushed toward the head of the pin.

8. The clip assembly of claim 6, wherein each of the opposed flexible arms comprises an internal protuberance that is configured to abut into a portion of the cap in the first position and be separated from the portion of the cap in the second position.

9. The clip assembly of claim 8, wherein the internal protuberance is separated from the portion of the cap in a third position in which the clip assembly is securely installed to the component.

10. The clip assembly of claim 1, further comprising an annular seal secured to the pin.

11. A securing system comprising:
    a panel comprising a hole; and
    a clip assembly configured to secure to at least one component, wherein the clip assembly comprises:
       a pin comprising a central beam having a distal end, wherein first and second cap retainers extend from the central beam, wherein the central beam is positioned through the hole of the panel; and
       a cap secured to the distal end of the pin, wherein the first cap retainer is configured to securely retain the cap at a first position on the pin, and wherein the second cap retainer is configured to securely retain the cap at a second position on the pin,
       wherein one of the pin or the cap comprises at least one detent and the other of the pin or the cap comprises at least one reciprocal recess configured to retain the at least one detent, wherein the at least one detent is securely retained within the at least one reciprocal recess in the first position.

12. The securing system of claim 11, wherein the first position is a removal prevention position that is configured to one or both of prevent the cap from being inadvertently removed from the pin, or prevent flexible arms of the pin from being squeezed together, wherein the second position is an unlocked position in which the second cap retainer maintains the flexible arms in a compressed state to facilitate removal of the clip assembly from the at least one component.

13. The securing system of claim 11, wherein the first cap retainer comprises a first ramp, and wherein the second cap retainer comprises a second ramp spaced apart from the first ramp.

14. The securing system of claim 11, wherein the cap comprises:
a covering nose; and
lateral beams extending from the covering nose, wherein at least one of the lateral beams comprises a ramp-engaging protuberance, wherein the ramp-engaging protuberance is secured between the first and second cap retainers in the first position, and wherein the ramp-engaging protuberance is supported by the second cap retainer in the second position.

15. The securing system of claim 11, wherein the pin further comprises:
opposed prongs at the distal end; and
opposed flexible arms outwardly extending from the central beam, wherein each of the opposed flexible arms comprises an internal protuberance that is configured to abut into a portion of the cap in the first position and be separated from the portion of the cap in the second position, wherein the cap is configured to be pushed toward a head of the pin to move the cap into the second position, and wherein the cap compresses the flexible arms towards one another as the cap is pushed toward the head of the pin.

16. The securing system of claim 15, wherein the internal protuberance is separated from the portion of the cap in a third position in which the clip assembly is securely installed to the component.

17. A clip assembly configured to secure to at least one component, the clip assembly comprising:
(a) a pin comprising:
(i) a head;
(ii) a central beam connected to the head and having a distal end opposite from the head,
(iii) opposed prongs at the distal end;
(iv) opposed flexible arms outwardly extending from the central beam, wherein each of the opposed flexible arms comprises an internal protuberance; and
(v) first and second cap retainers extend from the central beam;
(b) an annular seal secured to the pin; and
(c) a cap secured to the distal end of the pin, wherein the cap comprises a covering nose;
and lateral beams extending from the covering nose, wherein the first cap retainer is configured to securely retain the cap at a removal prevention position on the pin that one or both of prevents the cap from being inadvertently removed from the pin, or prevents the flexible arms of the pin from compressing together, wherein the second cap retainer is configured to securely retain the cap at an unlocked position on the pin in which the second cap retainer maintains the flexible arms in a compressed state to facilitate removal of the clip assembly from the at least one component, wherein the internal protuberance of each of the opposed flexible arms abuts into a portion of the cap in the removal prevention position and is separated from the portion of the cap in the unlocked position, wherein the cap is configured to be pushed toward the head of the pin to move the cap into the unlocked position, and wherein the cap compresses the flexible arms towards one another as the cap is pushed toward the head of the pin.

18. The clip assembly of claim 17, wherein the first cap retainer comprises a first ramp, wherein the second cap retainer comprises a second ramp spaced apart from the first ramp, wherein at least one of the lateral beams comprises a ramp-engaging protuberance, wherein the ramp-engaging protuberance is secured between the first and second ramps in the removal prevention position, wherein the ramp-engaging protuberance is supported by the second ramp in the unlocked position, wherein one of the pin or the cap comprises at least one detent and the other of the pin or the cap comprises at least one reciprocal recess configured to retain the at least one detent, wherein the at least one detent is securely retained within the at least one reciprocal recess in the removal prevention position, and wherein the internal protuberance is separated from the portion of the cap in an installed position in which the clip assembly is securely installed to the panel.

19. A clip assembly configured to secure to at least one component, the clip assembly comprising:
a pin comprising a central beam having a distal end, opposed prongs at the distal end, and opposed flexible arms outwardly extending from the central beam, wherein each of the opposed flexible arms comprises an internal protuberance, wherein first and second cap retainers extend from the central beam; and
a cap secured to the distal end of the pin, wherein the first cap retainer is configured to securely retain the cap at a first position on the pin, and wherein the second cap retainer is configured to securely retain the cap at a second position on the pin, wherein the internal protuberance is configured to abut into a portion of the cap in the first position and be separated from the portion of the cap in the second position.

20. The clip assembly of claim 19, wherein the internal protuberance is separated from the portion of the cap in a third position in which the clip assembly is securely installed to the component.

21. A securing system comprising:
a panel comprising a hole; and
a clip assembly configured to secure to at least one component, wherein the clip assembly comprises:
a pin comprising a central beam having a distal end, opposed prongs at the distal end, and opposed flexible arms outwardly extending from the central beam, wherein each of the opposed flexible arms comprises an internal protuberance, wherein first and second cap retainers extend from the central beam, wherein the central beam is positioned through the hole of the panel; and
a cap secured to the distal end of the pin, wherein the first cap retainer is configured to securely retain the cap at a first position on the pin, and wherein the second cap retainer is configured to securely retain the cap at a second position on the pin, wherein the internal protuberance is configured to abut into a portion of the cap in the first position and be separated from the portion of the cap in the second position.

22. The securing system of claim 21, wherein the cap is configured to be pushed toward a head of the pin to move the cap into the second position, and wherein the cap compresses the flexible arms towards one another as the cap is pushed toward the head of the pin.

23. The securing system of claim 21, wherein the internal protuberance is separated from the portion of the cap in a third position in which the clip assembly is securely installed to the component.

* * * * *